United States Patent
Liang et al.

(10) Patent No.: US 12,207,187 B2
(45) Date of Patent: Jan. 21, 2025

(54) METHOD AND SYSTEM FOR ELECTRONIC SHELF LABEL NETWORK ACCESS AND ROAMING COMMUNICATION PRELIMINARY CLASS

(71) Applicant: Hanshow Technology Co., Ltd., Jiaxing (CN)

(72) Inventors: Min Liang, Jiaxing (CN); Shiguo Hou, Jiaxing (CN); Yaping Ji, Jiaxing (CN); Yujing Wang, Jiaxing (CN); Ju Zhang, Jiaxing (CN); Guofeng Zhang, Jiaxing (CN); Qi Jiang, Jiaxing (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 0 days.

(21) Appl. No.: 18/798,412

(22) Filed: Aug. 8, 2024

(65) Prior Publication Data

US 2024/0406858 A1    Dec. 5, 2024

Related U.S. Application Data

(63) Continuation of application No. PCT/CN2023/060259, filed on Mar. 8, 2023.

(51) Int. Cl.
*H04W 48/20* (2009.01)
*H04W 64/00* (2009.01)

(52) U.S. Cl.
CPC ......... *H04W 48/20* (2013.01); *H04W 64/006* (2013.01)

(58) Field of Classification Search
CPC ... H04W 48/20; H04W 64/006; H04W 4/021; H04W 36/00; H04W 36/08; H04W 48/08; H04W 48/16; H04L 43/10
See application file for complete search history.

(56) References Cited

U.S. PATENT DOCUMENTS

| | | | |
|---|---|---|---|
| 9,117,420 B2 * | 8/2015 | Fujisawa | G09G 3/3216 |
| 9,538,446 B1 | 1/2017 | Kaushik | |

(Continued)

FOREIGN PATENT DOCUMENTS

| | | |
|---|---|---|
| CN | 101136059 A | 3/2008 |
| CN | 103152781 A | 6/2013 |

(Continued)

OTHER PUBLICATIONS

Gao, Tia, et al. "The advanced health and disaster aid network: A light-weight wireless medical system for triage." IEEE Transactions on biomedical circuits and systems 1.3 (2007): 203-216. (Year: 2007).*

(Continued)

*Primary Examiner* — Sharad Rampuria
(74) *Attorney, Agent, or Firm* — Nutter McClennen & Fish LLP

(57) ABSTRACT

A method and a system for electronic shelf label network access and roaming communication are disclosed in the present disclosure. The present disclosure greatly improves the success rate of a background server in selecting an optimal base station to timely communicate with an electronic shelf label that has newly entered a coverage area of an electronic shelf label system or moved, and ensures the reliability and stability of the communication between the background server and the electronic shelf label.

9 Claims, 2 Drawing Sheets

(56) References Cited

U.S. PATENT DOCUMENTS

| | | | |
|---|---|---|---|
| 2002/0002421 A1* | 1/2002 | Murofushi | G06Q 20/201 |
| | | | 700/214 |
| 2007/0112954 A1 | 5/2007 | Ramani et al. | |
| 2013/0185421 A1 | 7/2013 | Yang | |
| 2014/0351056 A1 | 11/2014 | Codato et al. | |
| 2017/0024756 A1 | 1/2017 | Hulth | |
| 2019/0282000 A1* | 9/2019 | Swafford | A47F 10/02 |
| 2020/0132470 A1* | 4/2020 | Xu | G06Q 30/0643 |

FOREIGN PATENT DOCUMENTS

| | | |
|---|---|---|
| CN | 105657786 A | 6/2016 |
| CN | 108764437 A | 11/2018 |
| CN | 110392383 A | 10/2019 |
| CN | 111935799 A | 11/2020 |
| CN | 112351479 A | 2/2021 |
| CN | 112601268 A | 4/2021 |
| CN | 113099516 A | 7/2021 |
| CN | 113163477 A | 7/2021 |
| CN | 113473424 A | 10/2021 |
| CN | 113840336 A | 12/2021 |
| CN | 113873686 A | 12/2021 |
| JP | 2019165374 A | 9/2019 |
| WO | 2021003595 A1 | 1/2021 |

OTHER PUBLICATIONS

China National Intellectual Proprety Administration, First Office Action and search report issued on Nov. 15, 2023 for counterpart Chinese patent application No. 202210242934.0 with machine EN translation (15 pages).

China National Intellectual Property Administration, Supplemental search report issued on Jan. 29, 2024 for counterpart Chinese patent application No. 202210242934.0 with machine EN translation (4 pages).

International search report issued for counterpart Chinese patent application No. PCT/CN2023/080259 mailed on May 22, 2023 (2 pages).

* cited by examiner

METHOD AND SYSTEM FOR ELECTRONIC SHELF LABEL NETWORK ACCESS AND ROAMING COMMUNICATION PRELIMINARY CLASS

CROSS-REFERENCE TO RELATED APPLICATION

The present disclosure is a continuation of International Application No. PCT/CN2023/080259 filed on Mar. 8, 2023, which claims priority to Chinese Patent Application No. 202210242934.0, entitled "METHOD AND SYSTEM FOR ELECTRONIC SHELF LABEL NETWORK ACCESS AND ROAMING COMMUNICATION", and filed on Mar. 11, 2022, all of which are hereby incorporated by reference in their entireties.

TECHNICAL FIELD

The present disclosure relates to the technical field of mobile communications, and particularly to a method and a system for electronic shelf label network access and roaming communication.

BACKGROUND

This section is intended to provide a background or context for the embodiments of the present disclosure set forth in the claims. The description here is not admitted to be the prior art just because it is included in this section.

In an electronic shelf label system, as illustrated in FIG. 1, a background server needs to communicate with an electronic shelf label via a base station, and there are many base stations in the network of the actual electronic shelf label system, so the background server should find the most reasonable base station to communicate with a designated electronic shelf label to ensure the communication transmission quality.

In the prior art, the electronic shelf label periodically sends a heartbeat to the base stations which report the power of the received heartbeat of the electronic shelf label to the background server. The background server selects an optimal base station based on the power of the heartbeat of the same electronic shelf label received by different base stations to communicate with the electronic shelf label. However, the prior art has the disadvantage that the heartbeat reported by the electronic shelf label is periodic, and in consideration of the power saving of the electronic shelf label, the period is generally long. When the electronic shelf label enters a base station coverage area, the background server cannot find the electronic shelf label in time to make it access the network. In addition, when the electronic shelf label moves from one base station coverage area to another base station coverage area, the background server cannot detect the movement of the electronic shelf label in time. In these two scenarios, if the background server needs to communicate with the electronic shelf label, the coverage base station cannot be selected for the communication with the electronic shelf label, resulting in the consequences of inability to communicate or communication failure.

SUMMARY

The embodiments of the present disclosure provide a method for electronic shelf label network access and roaming communication, including:

periodically sending, by an electronic shelf label and with a slow period T1, heartbeat signals to base stations, periodically receiving, by the electronic shelf label and with a period P1, base station signals, recording, by the electronic shelf label, power of the base station signals, and comparing the power of the base station signals received by the electronic shelf label at different time points to judge whether the electronic shelf label enters a base station coverage area or whether the electronic shelf label roams between base station coverage areas; and periodically sending, by the electronic shelf label and with a fast period T2, the heartbeat signals to the base stations if it is judged that the electronic shelf label enters a base station coverage area or roams between base station coverage areas, reporting, by the base stations, the received heartbeat signals to a background server, and selecting, by the background server, an optimal base station for communication with the electronic shelf label based on the power of the heartbeat signals received by the base stations.

The embodiments of the present disclosure further provide a system for electronic shelf label network access and roaming communication, including an electronic shelf label, base stations and a background server, and being configured to implement the method for electronic shelf label network access and roaming communication.

The embodiments of the present disclosure further provide a computer device, including a memory, a processor and a computer program which is stored in the memory and executable on the processor, and when executing the computer program, the processor implements the aforementioned method for electronic shelf label network access and roaming communication.

The embodiments of the present disclosure further provide a computer-readable storage medium storing a computer program, and when executed by a processor, the computer program implements the aforementioned method for electronic shelf label network access and roaming communication.

The embodiments of the present disclosure further provide a computer program product, including a computer program, and when executed by a processor, the computer program implements the aforementioned method for electronic shelf label network access and roaming communication.

In the prior art, the electronic shelf label periodically reports the heartbeat, and when the electronic shelf label enters a coverage area of the electronic shelf label system, the background server cannot find the electronic shelf label in time and make it access the network, and when the electronic shelf label moves from one base station coverage area to another base stations coverage area, and the background server also cannot detect the movement of the electronic shelf label in time. In these two scenarios, if the background server needs to communicate with the electronic shelf label, the covering base station cannot be selected for the communication with the electronic shelf label, resulting in the consequences of inability to communicate or communication failure. As compared with the technical solutions in the prior art, in the embodiments of the present disclosure, an electronic shelf label periodically sends heartbeat signals to base stations with a slow period T1; the electronic shelf label periodically receives base station signals with a period P1, and records the power of the base station signals; the power of the base station signals received by the electronic shelf label at different time points are compared to judge whether the electronic shelf label enters a base station coverage area or whether the electronic shelf label roams between base station coverage areas; if it is judged that the electronic shelf label enters a base station coverage area or roams between base station coverage areas, the electronic shelf label periodically sends the heartbeat signals to the base stations with a fast period T2, the base stations report the received heartbeat signals to a background server, and the background server selects an optimal base station for communication with the electronic shelf label based on the power of the heartbeat signals received by the base stations. Thus, it is possible to quickly discover scenarios including the electronic shelf label enters the coverage area of the electronic shelf label system and the electronic shelf label moves from one base station coverage area to another base station coverage area. In the present disclosure, the electronic shelf label reports the heartbeat with a non-fixed period, thereby greatly improving the success rate of the background server in selecting the optimal base station to timely communicate with the electronic shelf label that has newly entered the coverage area of the electronic shelf label system or moved, and ensuring the reliability and stability of the communication between the background server and the electronic shelf label.

BRIEF DESCRIPTION OF THE DRAWINGS

In order to more clearly illustrate the technical solutions in the embodiments of the present disclosure or in the prior art, the drawings to be used in the description of the embodiments or the prior art will be briefly introduced below. Obviously, the drawings involved in the following description only illustrate some embodiments of the present disclosure, and other drawings may be obtained based on these drawings by persons of ordinary skill in the art without paying any inventive effort. In the drawings.

DESCRIPTION OF THE EMBODIMENTS

In order that the objectives, technical solutions and advantages of the embodiments of the present disclosure are clearer, the embodiments of the present disclosure will be further described in detail with reference to the drawings. Here, the exemplary embodiments of the present disclosure and the description thereof are used to explain the present disclosure, rather than being used as limitations thereto.

Aiming at the problem existing in the prior art, the present disclosure proposes a method capable of quickly discovering a scenario an electronic shelf label enters a coverage area of an electronic shelf label system or the electronic shelf label moves from one base station coverage area to another base station coverage area, and quickly selecting an optimal base station for communication with the electronic shelf label, thereby ensuring a successful communication.

Figure 1:
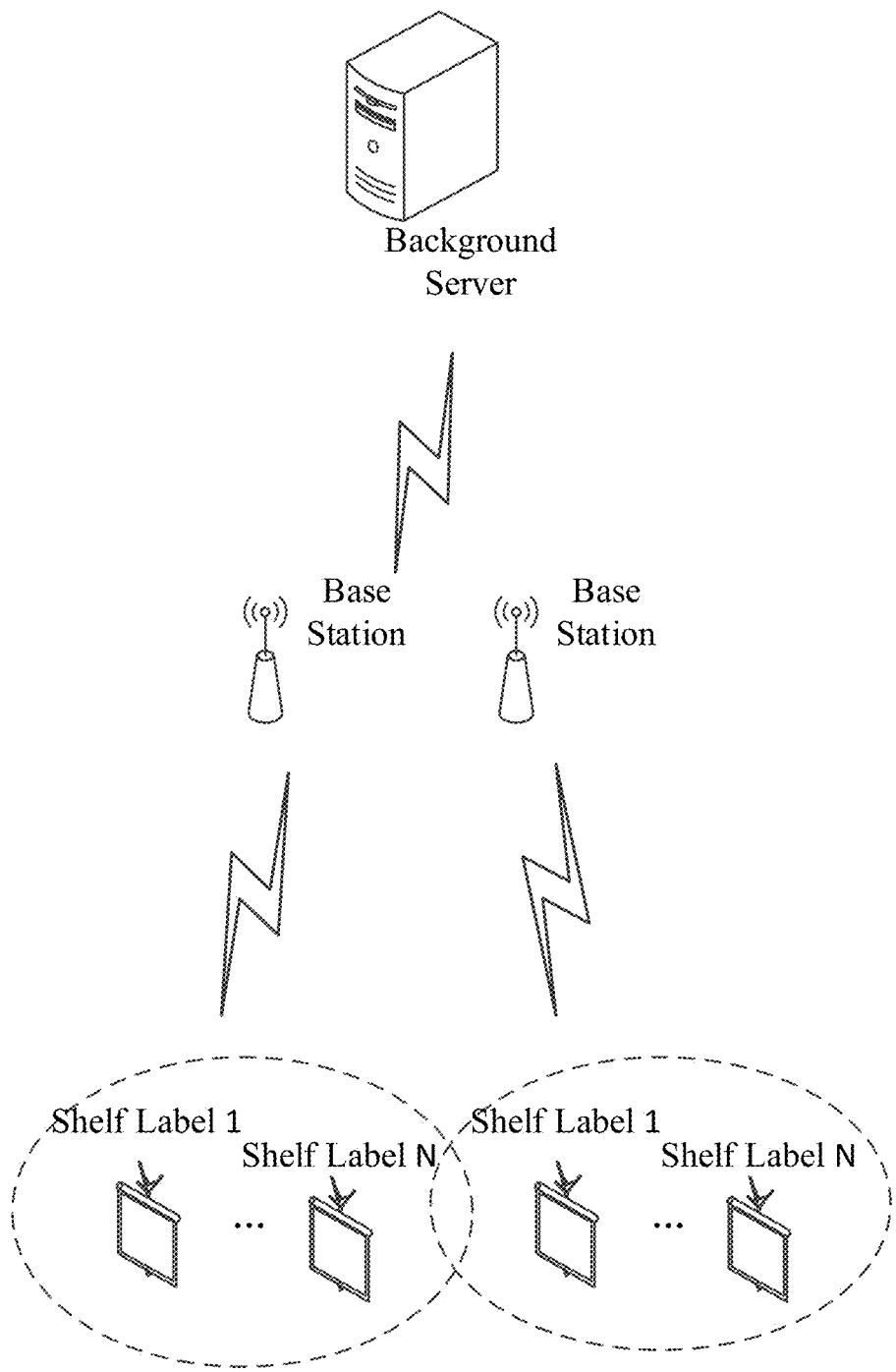
FIG. 1 illustrates an architecture diagram of electronic shelf labels, base stations and a background server.
Figure 2:
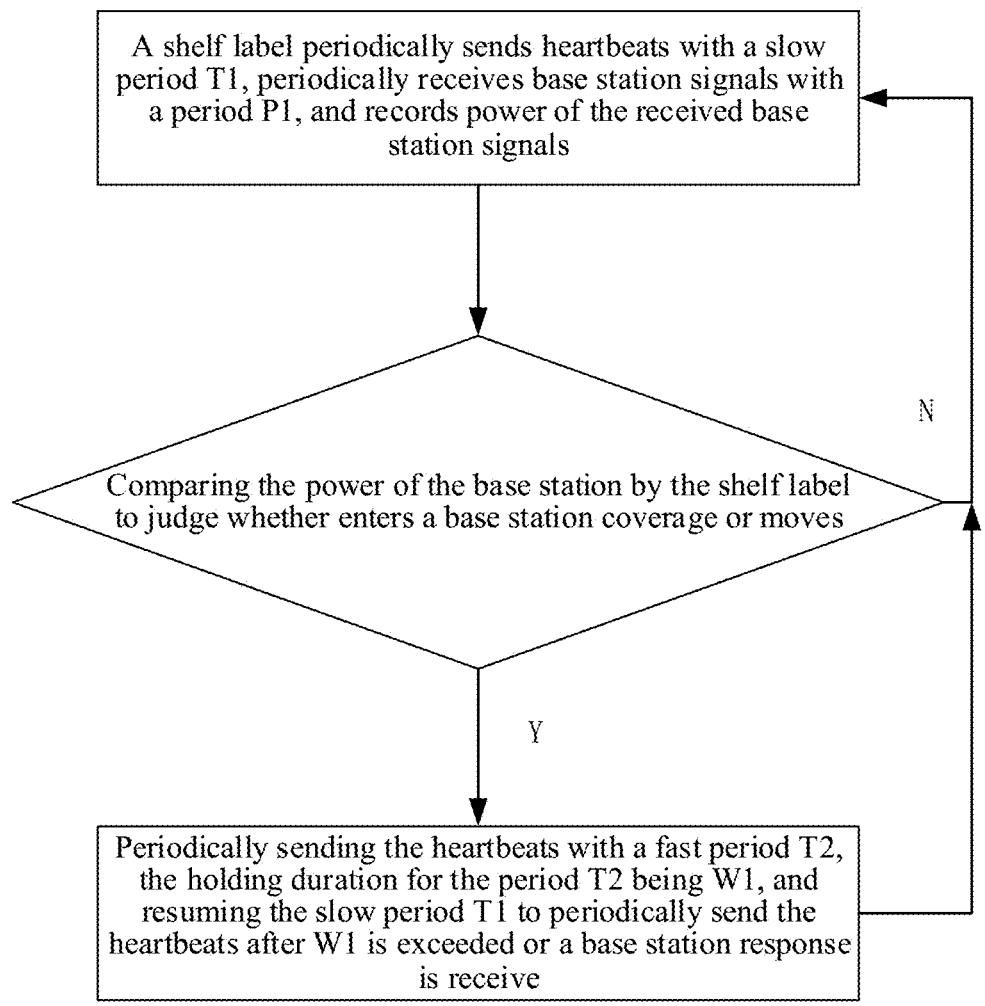
FIG. 2 illustrates a flowchart of a method for electronic shelf label network access and roaming communication according to an embodiment of the present disclosure.

FIG. 2 illustrates a flowchart of a method for electronic shelf label network access and roaming communication according to an embodiment of the present disclosure. As illustrated in FIG. 2, the method includes:

periodically sending, by an electronic shelf label and with a slow period T1, heartbeat signals to base stations, periodically receiving, by the electronic shelf label and with a period P1, base station signals, recording, by the electronic shelf label, power of the base station signals, and comparing the power of the base station signals received by the electronic shelf label at different time points to judge whether the electronic shelf label enters a base station coverage area or whether the electronic shelf label roams between base station coverage areas (the execution subject is the electronic shelf label);

periodically sending, by the electronic shelf label and with a fast period T2, the heartbeat signals to the base stations if it is judged that the electronic shelf label enters a base station coverage area or roams between base station coverage areas, reporting, by the base stations, the received heartbeat signals to a background server, and selecting, by the background server, an optimal base station for communication with the electronic shelf label based on the power of the heartbeat signals received by the base stations.

Specifically, the fast period and the slow period of the electronic shelf label are defined as follows, for example, the slow period has a typical value of 15 minutes, and the fast period has a typical value of 1 minute.

The slow period T1 is a period with which the electronic shelf label sends the heartbeat, P1 is a period with which the electronic shelf label receives the base station signal, and there is no relationship between the slow period T1 and the period P1.

The electronic shelf label periodically sends the heartbeat signals to the base stations with the slow period T1 means that it sends the heartbeat signals at the time points such as 0, T1, 2T1, 3T1, . . . and so on.

The electronic shelf label periodically receives the base station signals with the period P1 means that it receives the base station signals at the time points such as 0, P1, 2P1, 3P1, . . . and so on.

The electronic shelf label periodically sends the heartbeat signals to the base stations with the fast period T2 means that it sends the heartbeat signals at the time points such as 0, T2, 2T2, 3T2, . . . and so on.

Specifically, no matter whether entering the base station coverage area, the electronic shelf label continuously sends the heartbeat signals to the base stations, and when the electronic shelf label can receive the base station signal, it indicates that the electronic shelf label enters the base station coverage area. At this time, the electronic shelf label still continuously sends the heartbeat signals to the base stations.

By receiving the base station signal, the electronic shelf label discovers that it has entered the base station coverage area or that the base station coverage area where it is located has changed. If the electronic shelf label enters a coverage area from a non-coverage area, the background server needs to perform a network access operation on the electronic shelf label; and if the electronic shelf label moves from one base station coverage area to another base station coverage area, the background server needs to perform a roaming operation on the electronic shelf label.

Whether the electronic shelf label moves (roams) is judged by monitoring the original base station (i.e., the base station that the electronic shelf label previously entered). After the electronic shelf label moves and enters a new base station, the new base station may also be used as the original base station to judge whether the electronic shelf label moves again.

In the embodiment of the present disclosure, comparing the power of the base station signals received by the electronic shelf label at different time points to judge whether the electronic shelf label enters a base station coverage area includes:

if no base station signal is received at a first time point and a base station signal is received at a second time point, it indicates that the electronic shelf label has entered a base station coverage area; and if no base station signal is received at both the first time point and the second time point, it indicates that the electronic shelf label does not enter a base station coverage area.

Specifically, the first time point is earlier than the second time point.

In the embodiment of the present disclosure, comparing the power of the base station signals received by the electronic shelf label at different time points to judge whether the electronic shelf label roams between base station coverage areas includes:

if the power of a base station signal received at a first time point is great than the power of a base station signal received at a second time point and a difference therebetween exceeds a preset threshold value, it indicates that the electronic shelf label may move from one base station coverage area to another base station coverage area, and roam therebetween, and the preset threshold value is determined according to the actual situation;

if the power of the base station signal received at the first time point is great than the power of the base station signal received at the second time point and the difference therebetween does not exceed the preset threshold value, and the power of the base station signal receive at the second time point is less than a preset threshold, it indicates that the electronic shelf label may move from one base station coverage area to another base station coverage area, and roam therebetween, and the preset threshold is determined according to the actual situation.

In the embodiment of the present disclosure, the method further includes: setting, by the electronic shelf label, a holding duration for the fast period T2, and if the holding duration is exceeded or the electronic shelf label receives a base station response, resuming periodically sending, by the electronic shelf label, the heartbeat signals with the slow period T1.

Specifically, the heartbeat is periodically sent with a fast period T2 (T2<T1), the holding duration of the period T2 is W1, and the slow heartbeat period T1 is resumed after W1 is exceeded or the base station response is received (multiple times).

In this embodiment, W1 is exceeded means, for example, that when the electronic shelf label sends the heartbeat signals at 0, T2, 2T2 and 3T2 and W1 is between 3T2 and 4T2, it indicates that W1 is exceeded, and then the heartbeat signals are sent at 3T2+T1.

Specifically, the electronic shelf label may move multiple times and continuously monitor the change of the base station signal. If the electronic shelf label moves again after a movement, it is also necessary to adjust the sending of the heartbeat according to this process.

A plurality of APs (Access Point, such as base stations) connected to the background server may receive the heartbeat of the same electronic shelf label with different reception power. The background server selects a base station with the strongest reception power as an optimal base station based on the heartbeat of the electronic shelf label received by the base stations, and uses the selected base station to communicate with the electronic shelf label.

The embodiments of the present disclosure further provide a system for electronic shelf label network access and roaming communication, including an electronic shelf label, base stations and a background server, and being configured to implement the method for electronic shelf label network access and roaming communication.

The embodiments of the present disclosure further provide a computer device, including a memory, a processor and a computer program which is stored in the memory and executable on the processor, and when executing the computer program, the processor implements the aforementioned method for electronic shelf label network access and roaming communication.

The embodiments of the present disclosure further provide a computer-readable storage medium storing a computer program, and when executed by a processor, the computer program implements the aforementioned method for electronic shelf label network access and roaming communication.

The embodiments of the present disclosure further provide a computer program product, including a computer program, and when executed by a processor, the computer program implements the aforementioned method for electronic shelf label network access and roaming communication.

In the prior art, the electronic shelf label periodically reports the heartbeat, and when the electronic shelf label enters a coverage area of the electronic shelf label system, the background server cannot find the electronic shelf label in time and cannot make it access the network, and when the electronic shelf label moves from one base station coverage area to another base stations coverage area, and the background server also cannot detect the movement of the electronic shelf label in time. In these two scenarios, if the background server needs to communicate with the electronic shelf label, the covering base station cannot be selected for the communication with the electronic shelf label, resulting in the consequences of inability to communicate or communication failure. As compared with the technical solutions in the prior art, in the embodiments of the present disclosure, an electronic shelf label periodically sends heartbeat signals to base stations with a slow period T1; the electronic shelf label periodically receives base station signals with a period P1, and records the power of the base station signals; the power of the base station signals received by the electronic shelf label at different time points are compared to judge whether the electronic shelf label enters a base station coverage area or whether the electronic shelf label roams between base station coverage areas; if it is judged that the electronic shelf label enters a base station coverage area or roams between base station coverage areas, the electronic shelf label periodically sends the heartbeat signals to the base stations with a fast period T2, the base stations report the received heartbeat signals to a background server, and the background server selects an optimal base station for communication with the electronic shelf label based on the power of the heartbeat signals received by the base stations. Thus, it is possible to quickly discover scenarios including the electronic shelf label enters the coverage area of the electronic shelf label system and the electronic shelf label moves from one base station coverage area to another base station coverage area. In the present disclosure, the electronic shelf label reports the heartbeat with a non-fixed period, thereby greatly improving the success rate of the background server in selecting the optimal base station to timely communicate with the electronic shelf label that has newly entered the coverage area of the electronic shelf label system or moved, and ensuring the reliability and stability of the communication between the background server and the electronic shelf label.

Persons skilled in the art should appreciate that any embodiment of the present disclosure may be provided as a method, a system or a computer program product. Therefore, the present disclosure may take the form of a full hardware embodiment, a full software embodiment, or an embodiment combining software and hardware. Moreover, the present disclosure may take the form of a computer program product implemented on one or more computer usable storage mediums (including, but not limited to, a magnetic disc memory, CD-ROM, optical storage, etc.) including therein computer usable program codes.

The present disclosure is described with reference to a flowchart and/or a block diagram of the method, device (system) and computer program product according to the embodiments of the present disclosure. It should be appreciated that each flow and/or block in the flowchart and/or the block diagram and combinations of flows and/or blocks in the flowchart and/or the block diagram may be implemented by computer program instructions. Those computer program instructions may be provided to a processor of a general computer, a special-purpose computer, an embedded processor or other programmable data processing device to produce a machine, so that the instructions executed by the processor of the computer or other programmable data processing device produce devices for implementing specified functions in one or more flows in the flowchart and/or one or more blocks in the block diagram.

These computer program instructions may also be stored in a computer readable memory capable of guiding the computer or other programmable data processing devices to work in a particular manner, so that the instructions stored in the computer readable memory can produce manufacture articles including an instructing device which implements the function(s) specified in one or more flows in the flowchart and/or one or more blocks in the block diagram.

These computer program instructions may also be loaded onto the computer or other programmable data processing devices, so that a series of operation steps are performed on the computer or other programmable data processing devices to produce a processing implemented by the computer, thus the instructions executed on the computer or other programmable devices provide step(s) for implementing the function(s) specified in one or more flows in the flowchart and/or one or more blocks in the block diagram.

The specific embodiments described above make further detailed explanations to the objectives, technical solutions and advantageous effects of the present disclosure. It should be understood that those described above are only specific embodiments of the present disclosure and are not intended to limit the protection scope of the present disclosure. Any modification, equivalent substitution or improvement made within the spirit and principle of the present disclosure should fall within the protection scope of the present disclosure.

What is claimed is:

1. A method for electronic shelf label network access and roaming communication, comprising:
   periodically sending, by an electronic shelf label and with a slow period T1, heartbeat signals to base stations,
   periodically receiving, by the electronic shelf label and with a period P1, base station signals,
   recording, by the electronic shelf label, power of the base station signals, and
   comparing the power of the base station signals received by the electronic shelf label at different time points to judge whether the electronic shelf label enters a base station coverage area or whether the electronic shelf label roams between base station coverage areas; and
   periodically sending, by the electronic shelf label and with a fast period T2, the heartbeat signals to the base stations if it is judged that the electronic shelf label enters a base station coverage area or roams between base station coverage areas,
   reporting, by the base stations, the received heartbeat signals to a background server, and selecting, by the background server, an optimal base station for communication with the electronic shelf label based on the power of the heartbeat signals received by the base stations,
   wherein the method for electronic shelf label network access and roaming communication further comprises:
   setting, by the electronic shelf label, a holding duration for the fast period T2, and if the holding duration is exceeded or the electronic shelf label receives a base station response, resuming periodically sending, by the electronic shelf label, the heartbeat signals with the slow period T1.

2. The method for electronic shelf label network access and roaming communication according to claim 1, wherein comparing the power of the base station signals received by the electronic shelf label at different time points to judge whether the electronic shelf label enters a base station coverage area comprises: if no base station signal is received at a first time point and a base station signal is received at a second time point, it indicates that the electronic shelf label has entered a base station coverage area.

3. The method for electronic shelf label network access and roaming communication according to claim 1, wherein comparing the power of the base station signals received by the electronic shelf label at different time points to judge whether the electronic shelf label enters a base station coverage area comprises: if no base station signal is received at both a first time point and a second time point, it indicates that the electronic shelf label does not enter a base station coverage area.

4. The method for electronic shelf label network access and roaming communication according to claim 1, wherein comparing the power of the base station signals received by the electronic shelf label at different time points to judge whether the electronic shelf label roams between base station coverage areas comprises:
   if the power of a base station signal received at a first time point is great than the power of a base station signal received at a second time point and a difference therebetween exceeds a preset threshold value, it indicates that the electronic shelf label moves from one base station coverage area to another base station coverage area, and roams therebetween; and
   if the power of the base station signal received at the first time point is great than the power of the base station signal received at the second time point and the difference therebetween does not exceed the preset threshold value, and the power of the base station signal receive at the second time point is less than a preset threshold, it indicates that the electronic shelf label moves from one base station coverage area to another base station coverage area, and roams therebetween.

5. A system for electronic shelf label network access and roaming communication, comprising: an electronic shelf label, base stations and a background server, and being configured to implement a method for electronic shelf label network access and roaming communication, wherein the method for electronic shelf label network access and roaming communication comprises:
periodically sending, by an electronic shelf label and with a slow period T1, heartbeat signals to base stations,
periodically receiving, by the electronic shelf label and with a period P1, base station signals, recording, by the electronic shelf label, power of the base station signals, and
comparing the power of the base station signals received by the electronic shelf label at different time points to judge whether the electronic shelf label enters a base station coverage area or whether the electronic shelf label roams between base station coverage areas; and
periodically sending, by the electronic shelf label and with a fast period T2, the heartbeat signals to the base stations if it is judged that the electronic shelf label enters a base station coverage area or roams between base station coverage areas,
reporting, by the base stations, the received heartbeat signals to a background server, and selecting, by the background server, an optimal base station for communication with the electronic shelf label based on the power of the heartbeat signals received by the base stations,
wherein the method for electronic shelf label network access and roaming communication further comprises:
setting, by the electronic shelf label, a holding duration for the fast period T2, and if the holding duration is exceeded or the electronic shelf label receives a base station response, resuming periodically sending, by the electronic shelf label, the heartbeat signals with the slow period T1.

6. The system for electronic shelf label network access and roaming communication according to claim 5, wherein comparing the power of the base station signals received by the electronic shelf label at different time points to judge whether the electronic shelf label enters a base station coverage area comprises: if no base station signal is received at a first time point and a base station signal is received at a second time point, it indicates that the electronic shelf label has entered a base station coverage area.

7. The system for electronic shelf label network access and roaming communication according to claim 5, wherein comparing the power of the base station signals received by the electronic shelf label at different time points to judge whether the electronic shelf label enters a base station coverage area comprises: if no base station signal is received at both a first time point and a second time point, it indicates that the electronic shelf label does not enter a base station coverage area.

8. The system for electronic shelf label network access and roaming communication according to claim 5, wherein comparing the power of the base station signals received by the electronic shelf label at different time points to judge whether the electronic shelf label roams between base station coverage areas comprises:
if the power of a base station signal received at a first time point is great than the power of a base station signal received at a second time point and a difference therebetween exceeds a preset threshold value, it indicates that the electronic shelf label moves from one base station coverage area to another base station coverage area, and roams therebetween; and
if the power of the base station signal received at the first time point is great than the power of the base station signal received at the second time point and the difference therebetween does not exceed the preset threshold value, and the power of the base station signal receive at the second time point is less than a preset threshold, it indicates that the electronic shelf label moves from one base station coverage area to another base station coverage area, and roams therebetween.

9. A computer device, comprising a memory, a processor and a computer program which is stored in the memory and executable on the processor, wherein when executing the computer program, the processor implements a method for electronic shelf label network access and roaming communication as follows:
periodically sending, by an electronic shelf label and with a slow period T1, heartbeat signals to base stations,
periodically receiving, by the electronic shelf label and with a period P1, base station signals, recording, by the electronic shelf label, power of the base station signals, and
comparing the power of the base station signals received by the electronic shelf label at different time points to judge whether the electronic shelf label enters a base station coverage area or whether the electronic shelf label roams between base station coverage areas; and
periodically sending, by the electronic shelf label and with a fast period T2, the heartbeat signals to the base stations if it is judged that the electronic shelf label enters a base station coverage area or roams between base station coverage areas,
reporting, by the base stations, the received heartbeat signals to a background server, and selecting, by the background server, an optimal base station for communication with the electronic shelf label based on the power of the heartbeat signals received by the base stations,
wherein the method for electronic shelf label network access and roaming communication further comprises:
setting, by the electronic shelf label, a holding duration for the fast period T2, and if the holding duration is exceeded or the electronic shelf label receives a base station response, resuming periodically sending, by the electronic shelf label, the heartbeat signals with the slow period T1.

* * * * *